United States Patent [19]

Rautio

[11] 4,441,536

[45] Apr. 10, 1984

[54] MACHINE FOR HEWING SQUARE TIMBERS

[76] Inventor: Kauko Rautio, 52799 Mäntyharju, Finland

[21] Appl. No.: 220,249

[22] Filed: Dec. 24, 1980

[51] Int. Cl.³ .............................................. B27C 9/00
[52] U.S. Cl. ...................................... 144/39; 144/3 P; 144/181; 144/246 A; 144/245 A; 198/624
[58] Field of Search .................... 198/624; 144/37, 39, 144/118, 2 D, 3 P, 246 R, 246 C, 208 E, 162 R, 181, 245 A

[56] References Cited

U.S. PATENT DOCUMENTS

| | | | |
|---|---|---|---|
| 508,147 | 11/1893 | Niethammer | 144/181 |
| 641,202 | 1/1900 | Garland | 144/3 P |
| 1,670,360 | 5/1928 | Johnson | 144/3 P |
| 1,825,041 | 9/1931 | Babare | 144/3 P |
| 2,918,952 | 12/1959 | Searle | 144/208 E |
| 3,742,993 | 7/1973 | Morton et al. | 144/39 |
| 3,833,162 | 9/1974 | Sato | 144/246 F |
| 3,866,640 | 2/1975 | Sweet et al. | 144/3 P |
| 4,102,369 | 7/1978 | Rautio | 144/3 P |
| 4,222,420 | 9/1980 | Karlsson | 144/246 A |

FOREIGN PATENT DOCUMENTS 174529  3/1961  Sweden .......................... 144/3 P Primary Examiner—W. D. Bray
Attorney, Agent, or Firm—Martin Smolowitz

[57] ABSTRACT

A machine for hewing squared timbers from round trunks, with the aid of rotary cutters, before which there is a set of guiding rollers for the trunk to be hewn. The machine comprises two cutter pairs disposed immediately after each other and the axes of which form an angle of 90°. The set of trunk guiding rollers consists of at least one pair of pulling wheels with padded circumference and disposed thereafter a track-resembling pair of pulling roller units, all of which together move in a transverse direction following the thickness of the trunk that is being hewn, parallel, and feeding in a forward direction the trunk that is being hewn.

10 Claims, 2 Drawing Figures

MACHINE FOR HEWING SQUARE TIMBERS

The present invention concerns a machine for hewing squared timbers from round trunks with the aid of rotary cutters, before which there is a set of guiding rolls for the trunk to be hewn.

The set of guiding rolls consists, as a generally known rule, of a roller pair. But when the trunk to be hewn is conducted through rotary cutters, on one pair of rollers is not enough. If the trunk to be hewn has even minor uneven portions, or if it has even minor bends, the trunk will be guided in accordance with these uneven portions, whereby the finished hewn square timber will not be straight and it will rather conform to the uneven portions of the unhewn trunk.

SUMMARY OF INVENTION

The object of the invention is to eliminate the drawback mentioned and to provide a new type of machine for hewing squared timbers in which the uneven portions of the trunk have no influence on the quality of the square timber.

The machine of the invention is characterized in that it comprises two cutter pairs disposed immediately after each other, their axes forming with each other an angle of 90°, and that the set of trunk guiding rollers consists of at least one pair of pulling wheels with padded circumference and of a track-resembling pair of pulling roller units, all of which moving in a transverse direction following the thickness of the trunk that is being hewn, parallel and, feeding the trunk that is being hewn in forward direction.

With the aid of the invention, the trunk that is being hewn is kept throughout the feeding on one and the same path, because the set of pulling rollers gives support to the trunk over a very extensive range. The pairs of cutters placed after each other also support and guide the trunk during the feed process. It follows that the square timber will be of first grade.

An advantageous embodiment of the invention is characterized in that in each half of the set of guiding rollers, the pulling wheel and the pulling roller units have been rotatably carried in one frame beam, that both ends of the frame beam have been journalled in bell cranks, which in their turn have been mutually connected by a linkage rod so that a linkage quadrangle is formed, whereby the frame beam with its pulling wheels and pulling roller units moves in a transverse direction, following the thickness of the trunk without changing its direction. This is a simple and favourable design solution by which the pulling wheel and the pulling roller units keeps its direction unchanged, whereby the trunk lying between the halves of the set of guiding rollers is constantly and accurately guided on the proper path.

Another embodiment of the invention is characterized in that the pulling wheel and the pulling roller unit have been mutually connected by a chain transmission. With proper transmission ratio, correct and uniform feeding of the trunk to be hewn is obtained both from the pulling wheel and from the pulling roller unit.

One embodiment of the invention is further characterized in that both halves of the set of guiding rollers have located between the pulling wheel and the pulling and guiding roller units, a pre-smoothing cutter, which removes any uneven portions found on the trunk, such as branch stumps for instance. The padded pulling wheel yields elastically whenever a projecting branch stump hits it. The pre-smoothing cutter ensures that no factor deranging the direction of feed can occur at the pair of pulling roller units.

DESCRIPTION OF INVENTION

The invention is described in the following with the aid of an example, with reference being made to the attached drawing, wherein.

Figure 1:
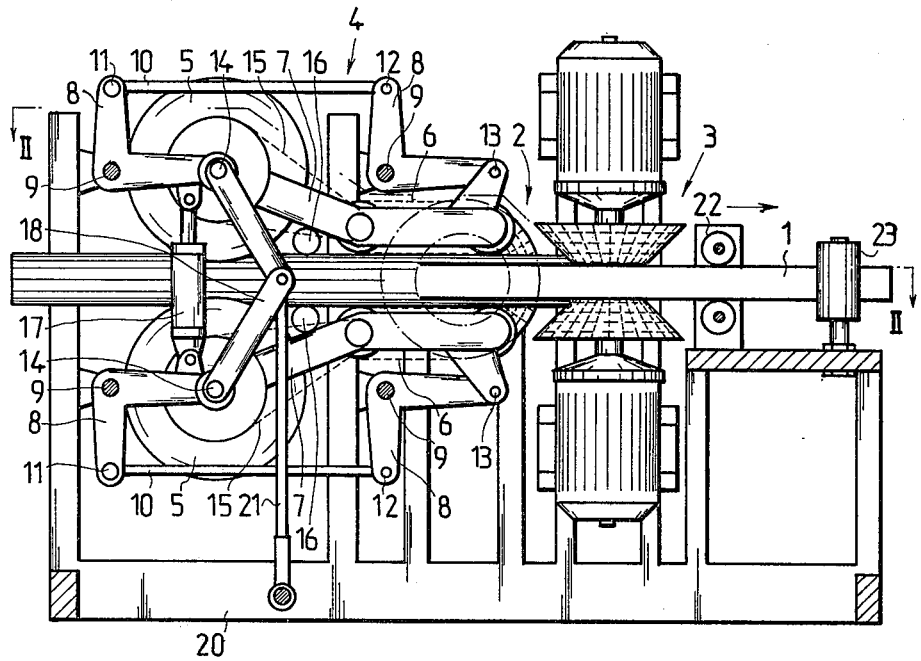
FIG. 1 shows a squared timber hewing machine according to the invention, in elevational view and partly sectioned.
Figure 2:
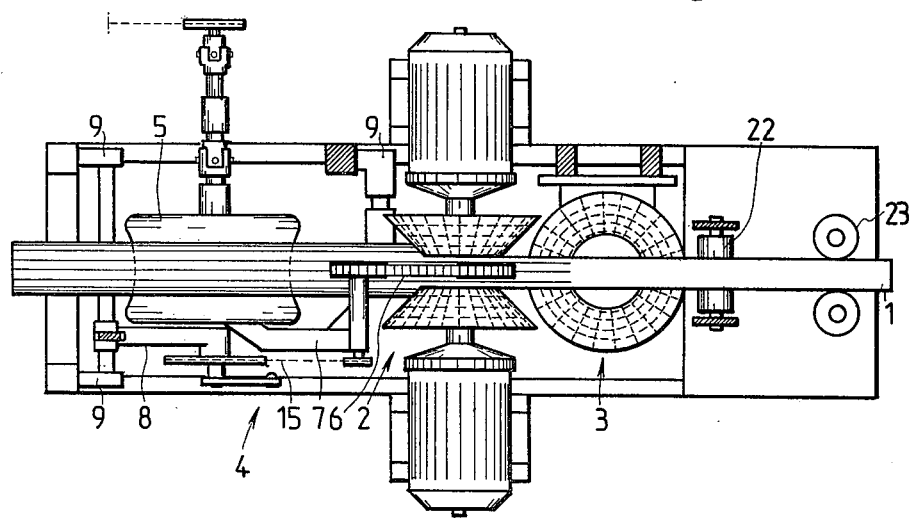
FIg. 2 shows a sectional view taken along the line II—II in FIG. 1.

The machine for hewing squared timbers 1 comprises two consecutive cutter pairs 2,3, through which the trunk is fed forward. Before the cutter pairs 2,3 lies a set of guiding rollers 4 for the trunk to be hewn, consisting of one pair of pulling wheels 5 with padded circumference and of a track-like pair of pulling roller units 6 disposed thereafter. Each of the track-like pulling roller units 6 consist of two rollers connected together by an endless track for contacting and pulling the timbers being hewn, as is shown more clearly in FIG. 2. All these pulling wheels 5 and track-like pulling roller units 6 may move in transverse directions, together, following the thickness of the trunk to be hewn and parallel, feeding in a forward direction the trunk to be hewn. In each half of the set of guiding rollers 4, the pulling wheel 5 and the pulling roller units 6 have been rotatably carried in one and the same frame beam 7. Both ends of the frame beam 7 have been journalled in bell cranks 8, which have in their turn been journalled at the points 9 been journalled to the frame of the machine. The opposite ends of the bell cranks 8 have been mutually connected by a linkage rod 10 so that a linkage quadrangle 11,12,13,14 is formed, whereby the frame beam 7 with its pulling wheels 5 and guiding roller unit 6 moves and, follows the thickness of the trunk to be hewn, without changing its direction. The pulling wheel 5 and the guiding roller units 6 have been mutually connected by means of a chain transmission 15.

Both halves of the set of guiding rollers 4 have between the pulling wheel 5 and the pulling roller units 6, a pre-smoothing cutter 16, which removes any uneven portions of the timbers being hewn, such as stumps after branches. The set of guiding rollers 4 is urged against the trunk to be hewn with the aid of a pressure cylinder 17 connected at each end to bell cranks 8. The centering of the set of guiding rollers 4 is adjusted with the aid of linkage levers 18 and the control rod 21 pivoted between their common pivot point 19 and the frame 20 of the machine.

After the cutter pairs 2,3 there are for the square timber guiding rollers 22,23, in connection with which, or after which, may be mounted at least one saw blade e.g. circular saw blades (not depicted), by which if desired the square timber is split into two or several parts.

With the aid of the set of guiding rollers 4 of the square timber hewing machine, the trunk to be hewn is kept throughout the feed process on one and the same path, because the set of guiding rollers supports the trunk over a very extensive range. It follows that the quality of the square timber is invariably first rate.

It is obvious to a person skilled in the art that different embodiments of the invention may vary within the scope of the claims presented below.

I claim:

1. A machine for hewing straight squared timbers from round trunks using rotary cutters and guiding rollers for guiding the trunk being hewn, wherein the machine comprises:
   (a) a main frame of the machine;
   (b) two rotary cutter pairs disposed immediately after each other with their axes forming with each other an angle of about 90°, said cutters being structurally and rotatably attached to said main frame of the machine, so that round trunks fed through the cutters are hewn to form squared timber; and
   (c) a set of trunk guiding rollers located before said cutter pairs and structurally attached to said main frame, said guiding rollers being centered relative to the trunk and being defined by at least one pair of pulling wheels each having padded circumference, with one pulling wheel being located above and one pulling wheel located below the trunk being hewn, and a pair of track-like pulling roller units, with one roller unit being located above and one roller unit being located below the trunk being hewn, each said roller unit comprising two rollers connected together by an endless track, said pulling roller units being disposed after said pulling wheels but before said cutter pairs, and means structurally interconnecting said pulling wheels and said pulling roller units so that said pulling wheels and pulling roller units all move together parallel to each other and in a transverse direction relative to the trunk being hewn, so that said pulling wheels and pulling roller units follow the thickness of the trunk being hewn, thereby feeding and guiding the trunk forwardly without changing its direction through said cutter pairs to produce straight hewn squared timbers.

2. The hewing machine according to claim 1, wherein in each half of the set of guiding rollers, the pulling wheel and the pulling roller unit are rotatably carried in a common frame beam, both ends of the frame beam being journalled in bell cranks, which in their turn are journalled to the main frame of the machine, the opposite ends of the bell cranks being mutually connected by a linkage rod so that a linkage quadrangle is formed, whereby the frame beam together with its pulling wheel and pulling roller unit move in a transverse direction following the thickness of the trunk that is being hewn, without changing direction of the trunk.

3. The hewing machine according to claim 1, wherein the pulling wheel and the pulling roller unit are mutually connected together and driven from said pulling wheel by a chain transmission.

4. The hewing machine according to claim 1, wherein in each half of the set of guiding rollers a presmoothing rotary cutter is located between the pulling wheel and the pulling roller unit, which cutter removes any uneven portion occurring on the trunk being hewn.

5. The hewing machine according to claim 1, wherein the set of guiding rollers are urged against the trunk to be hewn by a pressurizable cylinder, said cylinder being connected at each end to said bell cranks.

6. The hewing machine according to claim 1, wherein a second set of guiding rollers are rotatably attached to said main frame and located after said rotary cutter pairs for further guiding the hewn squared timber through said cutters.

7. The hewing machine according to claim 6, wherein at least one saw blade is mounted near said second set of guiding rollers.

8. A timber hewing machine according to claim 1, wherein said set of trunk guiding rollers is centered by linkage levers which are connected at a common pivot point to said main frame by an adjustable control rod.

9. A machine for hewing squared timbers from round trunks using rotary cutters and a set of guiding rollers for guiding the trunk being hewn, wherein the machine comprises:
   (a) a main frame of the machine;
   (b) two rotary cutter pairs disposed immediately after each other with their axes forming with each other an angle of about 90°, said cutters being structurally and rotatably attached to said main frame of the machine for hewing the round trunks to form squared timbers;
   (c) a set of trunk guiding rollers located before said rotary cutter pairs and structurally attached to said main frame, said guiding rollers being centered relative to the trunk being hewn and consisting of at least one pair of pulling wheels each having padded resilient circumference which conform to the trunk shape, with one pulling wheel being located above and one pulling wheel located below the trunk being hewn, and a pair of track-like pulling roller units, one pulling roller unit being located above and one pulling roller unit being located below the trunk being hewn, each said roller unit comprising two rollers connected together by an endless track, said pulling roller units being disposed after said pulling wheels but before said cutter pairs and means structurally interconnecting said pulling wheels and said pulling roller units so that all move together parallel to each other and in a transverse direction relative to the trunk being hewn and following the thickness of the trunk being hewn, and thereby feed the trunk forward through said cutter pairs; and
   (d) a second set of guiding rollers rotatably attached to said main frame and located after said cutter pairs for further guiding the hewn squared timber.

10. A machine for hewing squared timbers from round trunks using rotary cutters and guide rollers for guiding the trunk being hewn, wherein the machine comprises:
   (a) a main frame of the machine;
   (b) two rotary cutter pairs disposed immediately after each other with their axes forming with each other an angle of about 90°; said cutters being structurally and rotatably attached to said main frame of the machine for hewing the round trunks to form squared timbers; and
   (c) a set of trunk guiding rollers located before said rotary cutter pairs and structurally attached to said main frame of the machine, said guiding rollers being centered relative to the trunk and being difined by at least one pair of pulling wheels each having padded circumference, and a pair of track-like pulling roller units disposed after said pulling wheels but before said cutter pairs, each said roller unit comprising two rollers connected together by an endless track wherein in each half of said set of guiding rollers, the pulling wheel and the pulling roller units are all rotatably carried in a common frame beam, both ends of the frame beam being journalled in bell cranks, which in turn are journalled to the main frame of the machine, the opposite ends of the bell cranks being mutually connected by a linkage rod so that a linkage quadrangle is formed, whereby the frame beam together with its pulling wheel and pulling roller units move in a transverse direction and parallel to each other following the thickness of the trunk being hewn, thereby feeding forward the trunk through the cutters without changing the direction of the trunk to produce straight hewed timbers.

* * * * *